United States Patent [19]
Fett

[11] 3,949,209
[45] Apr. 6, 1976

[54] MULTIPLE-GENERATING REGISTER

[75] Inventor: Darrell L. Fett, Scottsdale, Ariz.

[73] Assignee: Honeywell Information Systems, Inc., Phoenix, Ariz.

[22] Filed: Apr. 4, 1975

[21] Appl. No.: 565,182

[52] U.S. Cl. ............................................. 235/164
[51] Int. Cl.² ........................ G06F 7/52; G06F 7/39
[58] Field of Search ............ 235/92 DP, 164; 445/1

[56] References Cited
UNITED STATES PATENTS
3,887,799   6/1975   Lindgren............................. 235/164

*Primary Examiner*—R. Stephen Dildine, Jr.
*Attorney, Agent, or Firm*—Edward W. Hughes; Walter W. Nielsen

[57] ABSTRACT

A multiple-generating register generates one of several possible multiples of a binary number which is input thereto in response to a respective one of a plurality of multiple-generating commands. The multiple-generating register comprises a control circuit for generating the multiple-generating commands in response to a three-bit control signal and comprises further a plurality of selector latch logic circuits. Each selector latch logic circuit receives as a first input a respective bit of the input binary number and receives as a second input the next lowest order bit of the input binary number, except that the selector latch logic circuit which receives as a first input the lowest order bit of the input binary number receives as a second input a zero-valued binary bit. The plurality of selector latch logic circuits generate a binary number that is a multiple of the input binary number, which multiple is equal to the input binary number times ±1, ±2, or 0, depending upon the informational content of the three-bit control signal.

4 Claims, 5 Drawing Figures

MULTIPLE-GENERATING REGISTER

CROSS-REFERENCE TO RELATED APPLICATIONS

1. Selector Latch Gate invented by D. L. Fett bearing Ser. No. 484,373, filed June 28, 1974, and assigned to the same assignee as the present invention.
2. Current Mode Carry Look-Ahead Array invented by H. W. Miller bearing Ser. no. 562,327, filed Mar. 26, 1975, now U.S. Pat. No. 3,925,652, and assigned to the same assignee as the present invention.
3. Current Mode Arithmetic Logic Array invented by H. W. Miller bearing Ser. No. 562,316, filed Mar. 26, 1975, now U.S. Pat. No. 3,925,651, and assigned to the same assignee as the present invention.
4. Current Mode Carry Save Adder invented by H. W. Miller bearing Ser. No. 618,709, filed Oct. 1, 1975, and assigned to the same assignee as the present invention.
5. High Speed Binary Multiplication System Employing a Plurality of Multiple Generator Circuits invented by J. L. Kindell bearing Ser. No. 642,844, filed Dec. 22, 1975, and assigned to the same assignee as the present invention.
6. Multiple-Generating Register invented by J. L. Kindell bearing Ser. No. 642,845, filed Dec. 22, 1975, and assigned to the same assignee as the present invention.

BACKGROUND OF THE INVENTION

This invention relates generally to digital registers and, in particular, to a multiple-generating register for generating one of several possible multiples of a binary number which is input thereto.

In the digital computer art it is often necessary to generate one of several possible multiples of a given binary number for a particular purpose. The present invention has utility, for example, in a high speed binary multiplier circuit which performs multiplication by means of an algorithm requiring the formation of partial products of the given multiplicand as a function of the given multiplier. The partial products are formed by generating multiples of ±1, ±2, or 0 times the given multiplicand, depending upon the given multiplier, and summing those multiples into the partial products. The present invention also has utility in divider and data-shifting circuits and in other digital circuits employed in the processing of data in binary form, as will be apparent to one skilled in the art.

SUMMARY OF THE INVENTION

It is an object of the present invention to provide a multiple-generating register.

It is also an object of the present invention to provide a multiple-generating register which receives a binary number as an input and generates a binary number as an output in the form of a multiple of ±1, ±2, or 0 times the binary number input, depending upon the informational content of a control signal to which the multiple-generating register is responsive.

It is a further object of the present invention to provide a high speed multiple-generating register which utilizes current mode logic circuits.

These and other objects are achieved in accordance with a preferred embodiment of the invention by providing a multiple-generating register comprising a control circuit and a plurality of selector latch logic circuits. The control circuit is responsive to a 3-bit control signal and to a clock signal for generating a particular one of several possible multiple-generating commands representing, respectively, a desired output binary number of ±1, ±2, or 0 times the given input binary number. The plurality of selector latch logic circuits are responsive to the given input binary number and also to the particular multiple-generating command. Each of the logic circuits receives as a first input a respective bit of the input binary number and receives as a second input the next lowest order bit of the input binary number, except that the logic circuit which receives as a first input the lowest order bit of the input binary number receives as a second input a zero-valued binary bit. In response to the particular multiple-generating command generated by the control circuit, the plurality of logic circuits together generate the particular multiple associated with such command, and hold such multiple at their output lines until they are reset by a reset signal in preparation for a subsequent multiple-generating operation.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
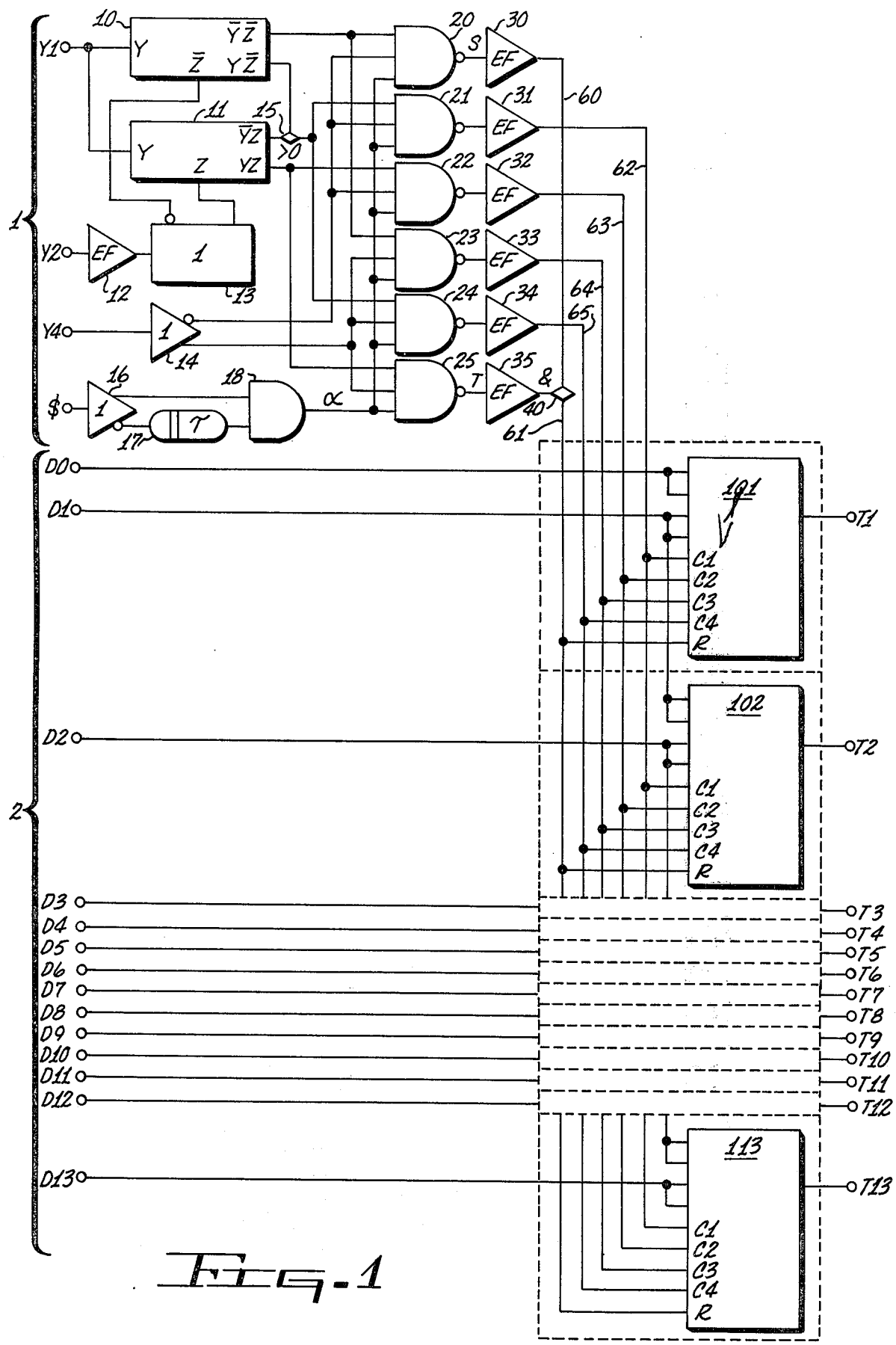
FIG. 1 shows a block diagram illustrating a preferred embodiment of the multiple-generating register of the present invention.

Referring now to FIG. 1, a block diagram of the multiple-generating register is shown. Reference number 1 in FIG. 1 indicates generally the control circuit of the multiple-generating register, and reference numeral 2 indicates generally the plurality of selector latch logic circuits 101–113 which perform the desired multiple-generating function.

Control circuit 1 comprises logic gates 10 and 11, emitter follower 12, inverting/non-inverting logic gate 13, inverting/non-inverting amplifier 14, NAND-gates 20–25, and emitter followers 30–35. Control circuit 1 is enabled by a clocking circuit comprising inverting/non-inverting amplifier 16, delay circuit 17 and AND-gate 18. Control circuit 1 is responsive to a 3-bit control signal $Y_1$ $Y_2$ $Y_4$, as well as to a clocking signal $, and generates a plurality of possible multiple-generating commands in the form of a 4-bit control signal C1 C2 C3 C4 over lines 62–65 and a reset command R over line 61.

The multiple-generating register 2 comprises, in a preferred embodiment, 13 selector latch logic circuits 101-113. Each of the selector latch logic circuits 101-113 receives as inputs the C1-C4 signals over lines 62-65, respectively, and the reset signal R over line 61. The state of signals C1-C4 and R may be either a binary 0 or a 1, depending upon the particular state of the $Y_1$, $Y_2$, $Y_4$, and $ input signals into control circuit 1. Each of the selector latch logic circuits 101-113 receives as a first input thereto a respective bit of the input binary number D1, D2, ..., D13. For example, logic circuit 101 receives the D1 bit of the input binary number, logic circuit 102 receives the D2 bit of the input binary number, and so forth. Each logic circuit 101-113 receives as a second input the next lowest order bit of the input binary number, except that logic circuit 101 receives as its second input a zero-valued binary bit D0. Thus logic circuit 101 receives as a first input D1 representing the lowest order bit of the input binary number and receives as a second input D0 which is a zero-valued binary bit. Logic circuit 102 receives as a first input D2 of the input binary number and receives as a second input the D1 bit of the input binary number. And logic circuits 103-113 receive first and second inputs in similar fashion.

Each of the logic circuits 101-113, in response to a particular multiple-generating command of the form C1 C2 C3 C4 received over lines 62-65, generates a particular multiple T1, T2, ..., T13, respectively, of the bit received from the input binary number D1, D2, ..., D13, in a manner to be described in further detail below. The output binary signal T1, T2, ..., T13, is equal to the input binary signal D1, D2, ..., D13 multiplied by ±1, ±2, or 0, depending upon the particular state of control signals $Y_1$, $Y_2$, and $Y_4$. While in the preferred embodiment the multiple-generating register has a 13-bit capacity, it will be apparent to one skilled in the art that various alternative embodiments utilizing different bit capacities may be constructed according to the particular capacities required of the multiple-generating register.

In FIG. 1, the diamond-shaped symbol at junction 15 merely represents the logic function of inclusive OR at such junction, and such symbol does not necessarily represent additional required logic circuitry. Also, the diamond-shaped symbol at junction 40 represents the logic function AND at such junction, which logic function is inherently performed at such point as a result of the preceding emitter follower pair 30 and 35; if desired, the output of emitter followers 30 and 35 could be combined in a 2-input AND-gate.

Referring now to the hereinbelow set forth STATE TABLE, the operation of control circuit 1 will first be described.

STATE TABLE

| $ | Y4 | Y2 | Y1 | C1 | C2 | C3 | C4 | R | Ti |
|---|----|----|----|----|----|----|----|----|-----|
| 1 | 0 | 0 | 0 | 1 | 1 | 1 | 1 | 0 | 0 |
| 1 | 0 | 0 | 1 | 0 | 1 | 1 | 1 | 1 | $D_i$ |
| 1 | 0 | 1 | 0 | 0 | 1 | 1 | 1 | 1 | $\overline{D_i}$ |
| 1 | 0 | 1 | 1 | 1 | 0 | 1 | 1 | 1 | $\overline{D_{i-1}}$ |
| 1 | 1 | 0 | 0 | 1 | 1 | 0 | 1 | 1 | $D_{i-1}$ |
| 1 | 1 | 0 | 1 | 1 | 1 | 1 | 0 | 1 | $D_i$ |
| 1 | 1 | 1 | 0 | 1 | 1 | 1 | 0 | 1 | $D_i$ |
| 1 | 1 | 1 | 1 | 1 | 1 | 1 | 1 | 0 | 0 |
| 0 | —* | — | — | 1 | 1 | 1 | 1 | 1 | $D_i$ |

*The "Don't Care" condition is represented by "—".

On the left-hand side of the STATE TABLE appear various combinations of the three input control signals $Y_4$, $Y_2$, and $Y_1$, and the clock signal $. On the right-hand side of the STATE TABLE appear the resulting states of signals C1-C4, R, and $T_i$, for the given combinations of input control signals $Y_4$, $Y_2$, and $Y_1$, and the clock signal $.

The operation of the control circuit 1 will be explained for the condition when Y4=0, Y2=0, and Y1=0, in order to illustrate the various states when the circuit elements comprising control circuit 1 assume under such input conditions. Since Y4=0, the non-inverting output of amplifier 14 will also be a binary 0, and the outputs of NAND-gates 23-25 will therefore be binary 1's since a NAND-gate generates a binary 0 output if and only if all the inputs thereto are binary 1's.

Since Y2=0, gate 13 transmits a non-inverted output Z equal to a binary 0 to logic gate 11 and an inverted output $\overline{Z}$ equal to a binary 1 to logic gate 10. Logic gate 11 accepts Y and Z inputs and generates the logic functions $\overline{YZ}$ and YZ. Logic gate 10 performs the same function as logic gate 11; however, because a $\overline{Z}$ is input rather than a Z, it generates outputs $Y\overline{Z}$ and $\overline{YZ}$. Under the given conditions, the $Y\overline{Z}$ output of logic gate 10 is a binary 1, and the $\overline{YZ}$ output is a binary 0. The YZ output of logic gate 11 is a binary 0, and the $\overline{YZ}$ output is a binary 0.

Figure 4:
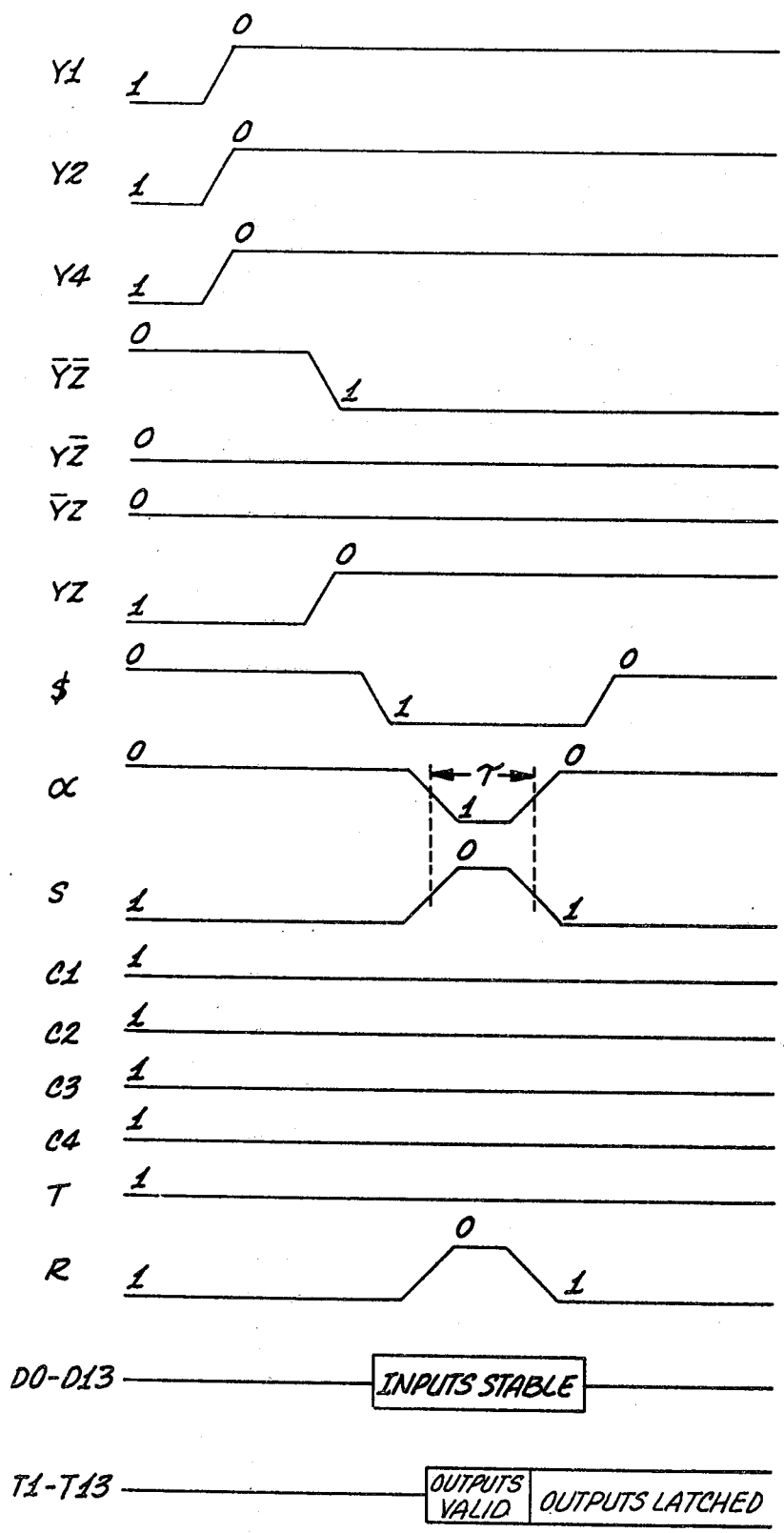
FIG. 4 shows a timing diagram illustrating the operation of the embodiment of FIG. 1 for one state of the control signals Y4 Y2 Y1.

FIG. 4 shows a timing diagram illustrating the timing relationship between control signals Y1, Y2, and Y4, logic signals $\overline{YZ}$, $Y\overline{Z}$, $\overline{YZ}$, and YZ generated by logic gates 10 and 11, clock signal S, signal $\alpha$ generated by AND gate 18, signal S generated by NAND-gate 20, signals C1-C4 generated by NAND-gates 21-24 respectively, signal T generated by NAND-gate 25, reset signal R generated by the distributive-AND junction 40, input bits D0-D13, and output bits T1-T13. It will be seen from FIG. 4 that a short time after the 3-bit control signal Y4 Y2 Y1 switches from 111 to 000 logic signals $Y\overline{Z}$ and $\overline{YZ}$ switch states. This is due to the propagation delay time in circuits 11-13.

When the clock input $ to gate 16 switches to a binary 1, indicating an "ON" condition the non-inverting output of gate 16 also switches to a binary 1. The inverting output of gate 16 switches to a binary 0 at the same time that the clock input $ becomes a binary 1; however, delay circuit 17 continues to generate a binary 1 output until the expiration of time T after the switching of clock signal $. Accordingly, prior to the expiration of time T AND-gate 18 generates signal $\alpha$ in the logical 1 state to NAND-gates 20-25.

Since NAND-gate 20 receives a binary 1 input over each of its input lines, it generates a signal S in the logical 0 state which is transmitted to emitter follower 30 and to line segment 60. NAND-gate 21 has a binary 0 transmitted to the input line uppermost in FIG. 1 and a binary 1 transmitted to its other input lines, so that it generates a binary 1 output over line 62. NAND-gate 22 also receives a binary 0 input over the input line uppermost in FIG. 1 and a binary 1 input on its other two input lines, so that it generates a binary 1 output over line 63. Since the inputs to the distributed-AND connection 40 consist of a binary 0 over line segment 60 and a binary 1 from emitter follower 35, the output of such junction is a binary 0, which is transmitted as reset signal R to logic gates 101-113. The binary 1 outputs appearing over lines 62-65 appear as binary 1 inputs to the C1-C4 inputs, respectively, of logic gates 101-113. Input bits D0-D13 are in a stable condition at the same time reset signal R=0 (see FIG. 4), and the output bits T1-T13 are each switched to the 0 state (see STATE TABLE), where they remain latched until the next clock cycle.

For other given input states of the Y4, Y2, Y1, and $ signals, the respective output control signals C1–C4 and reset signal R will be generated in accordance with the indicated states appearing in the STATE TABLE. It will be noted that at any particular time $t$ when the clock signal is in the 0 state, each of signals C1–C4 is a 1 and reset signal R is a 1. The output for such condition is represented by $D_{i_{(t-T)}}$ meaning that the output is the same as it was one cycle T ago. In other words, the outputs of the register remain latched until one of signals C1–C4 or R goes to 0 during the next clock cycle.

Figure 2:
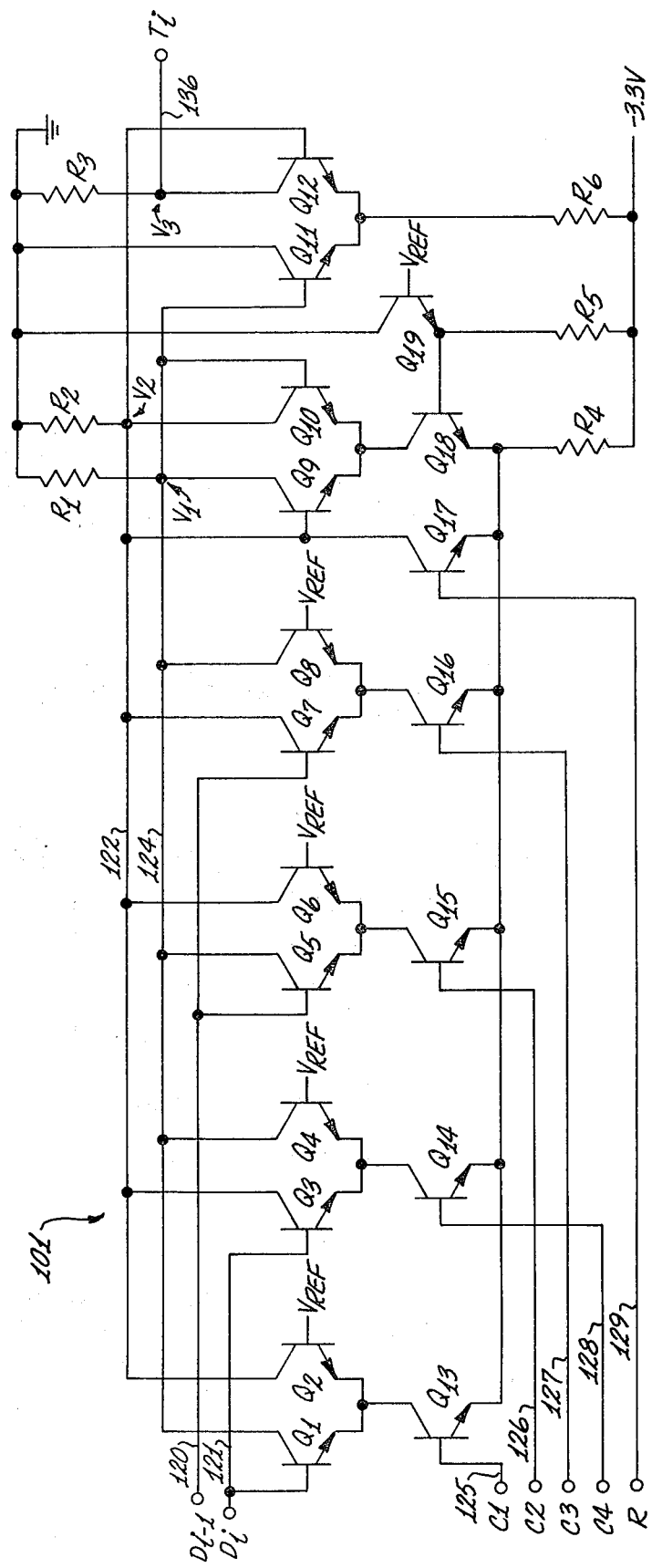
FIG. 2 shows a detailed circuit diagram of a representative one of the selector latch logic circuits shown in FIG. 1.

Referring now to FIG. 2, selector latch logic circuit 101, which is identical to selector latch logic circuits 102–113, is illustrated in the form of a detailed circuit schematic. Selector latch logic circuit 101 is a modification of one embodiment of the invention disclosed in the aforementioned U.S. application Ser. No. 484,373 of D. L. Fett, entitled "Selector Latch Gate," and assigned to the same assignee as the present invention.

Selector latch logic circuit 101 receives as a first input thereto a bit $D_i$ of the input binary number whose multiple is to be generated. Bit $D_i$ is transmitted to selector latch logic circuit 101 over line 121. It receives as a second input thereto the next lowest order bit $D_{i-1}$ of the input binary number over line 120. In the case of logic circuit 101, $D_i$ is D1, and $D_{i-1}$ is D0. The selector latch logic circuit also receives as control inputs thereto control signals C1–C4 over lines 125–128, respectively, and reset signal R over line 129.

Selector latch logic circuit 101 comprises a first pair of upper level current switches $Q_1$–$Q_2$ and $Q_3$–$Q_4$, and a second pair of upper level current switches $Q_5$–$Q_6$ and $Q_7$–$Q_8$. Selector latch logic circuit 101 further comprises four lower level current switches, $Q_{13}$–$Q_{16}$, a latch circuit $Q_9$–$Q_{10}$, a register current switch $Q_{18}$, a first current lead 122, a second current lead 124, an output buffer circuit $Q_{11}$–$Q_{12}$, and a −3.3V current source. The output $T_i$ of the selector latch logic circuit is generated over line 136 and equals T1 in the case of selector latch logic circuit 101.

N-P-N transistors $Q_1$–$Q_{18}$ operate in a soft-saturating current mode. Transistor $Q_{19}$ and resistor $R_5$ serve to shift the reference voltage by approximately 0.8V. $V_{ee}$ is typically −3.3V, and $V_{Ref}$ is approximately −0.26V. A negative logic convention is employed, according to which a logical 0 is represented by a voltage of 0.0V and a logical 1 is represented by −0.5V. Each of transistors $Q_1$–$Q_{19}$ becomes conductive when its base-to-emitter potential reaches approximately 0.8V.

The latch portion of the logic circuit 101, comprising transistors $Q_9$ and $Q_{10}$, serves to store the information transmitted to the latch from the upper level current switches $Q_1$–$Q_2$, $Q_3$–$Q_4$, $Q_5$–$Q_6$, and $Q_7$–$Q_8$. The latch portion of the logic circuit 101 is locked or latched in either a 0 state or a 1 state depending upon the state of the particular input signal $D_i$ or $D_{i-1}$ and the state of reset signal R which are applied to the logic circuit 101. Transistor $Q_9$ is latched in a conductive state when its base is at ground potential, which is the condition only when no conductive paths are completed from ground to the current source across the collector-emitter junctions of transistors $Q_2$, $Q_3$, $Q_6$, or $Q_7$ and when C1–C4 and R are in the logical 1 state, the current path being from ground through resistor $R_1$, across the collector-emitter junctions of transistors $Q_9$ and $Q_{18}$ through resistor $R_4$ to $V_{ee}$. When transistor $Q_9$ is conductive transistor $Q_{10}$ is nonconductive, since transistor $Q_{10}$ under such condition has a lower potential applied to its base, rendering it nonconductive. The switching of transistor $Q_{12}$ tracks that of transistor $Q_9$, and the switching of transistor $Q_{11}$ tracks that of transistor $Q_{10}$. When transistors $Q_9$ $Q_{12}$ are nonconductive, output line 136 is at ground potential, representing a binary 0 output. Conversely, when transistors $Q_9$ and $Q_{12}$ are conductive, output line 136 is at a potential less than 0.0V, representing a binary 1 output.

The lower level current switches, represented by transistors $Q_{13}$–$Q_{16}$, are each controlled by a respective one of the control signals C1–C4 transmitted over lines 125–128 respectively. When a particular one of control signals C1–C4 is at 0.0V, representing a binary 0 state, the switching transistor to whose base such control signal is applied is rendered conductive, affording a current path between ground and the current source, provided that one or the other of the upper level current switches associated with the particular lower level current switch is rendered conductive at the same time. For example, when input signal C1=0 and input bit $D_1$=0, transistors $Q_{13}$ and $Q_1$, respectively, are rendered conductive, to create a current path from ground across resistor $R_1$, over line 124, across the collector-emitter junctions of transistor $Q_1$ and $Q_{13}$, through resistor $R_4$ to the −3.3V current source. When signals C1–C4 and R are all in the logical 1 state, transistors $Q_{13}$–$Q_{17}$ are rendered nonconductive, transistor $Q_{18}$ is conductive, and data is stored by the latch, consisting of transistors $Q_9$, $Q_{10}$, and $Q_{18}$ and resistors $R_1$, $R_2$, and $R_4$.

Considering now the situation when reset signal R=1, a −0.5V signal level is applied to the base of transistor $Q_{17}$, maintaining such transistor in a nonconductive state, so that no current flows from ground through resistor $R_2$ across the collector-emitter junction of transistor $Q_{17}$, across resistor $R_4$ to the −3.3V current source. When reset signal R=0, 0.0V is applied to the base of transistor $Q_{17}$, turning on such transistor and creating a current path from ground across resistor $R_2$, across the collector-emitter junction of transistor $Q_{17}$, across resistor $R_4$ to the −3.3V current source. As a result, the voltage at point $V_2$ becomes less than ground potential, and the voltage applied to the base of transistor $Q_{12}$ is driven down to render transistor $Q_{12}$ nonconductive and force a 0 output over line 136. When reset signal R again returns to logical state 1, current is transferred from transistor $Q_{17}$ to transistor $Q_{18}$, and a logical 0 state is stored in the latch until the next clock cycle, when input data may alter that state.

The operation of selector latch logic circuit 101 will now be explained for the condition when a multiple-generating command in the form of control signals C1–C4 directs that the multiple-generating register generate an output binary number equal to the input binary number times unity. The multiple-generating register performs such function when the 3-bit input control signal is either a binary 5 or a binary 6, that is, either when Y4 Y2 Y1 = 101 or Y4 Y2 Y1 = 110. Given such states of the input control signals, the corresponding multiple-generating command transmitted to the selector latch logic circuits 101–113 over lines 62–65 assumes the form C1 C2 C3 C4 = 1110. Because signals C1–C3 are all binary 1's, transistors $Q_{13}$, $Q_{15}$, and $Q_{16}$ are nonconductive. Transistor $Q_{14}$ is rendered conductive, since signal C4 applied to its base is a binary 0.

Accordingly, the output signal transmitted over line 136 is dependent solely upon the condition of transistors $Q_3$ and $Q_4$, which in turn are controlled by the $D_i$ signal over line 121. When the input bit $D_i=1$, transistor $Q_3$ is off, and transistor $Q_4$ is on, creating a current path from ground across resistor $R_1$ over line 124, across the collector-emitter junctions of transistors $Q_4$ and $Q_{14}$, through resistor $R_4$ to the $-3.3V$ current source. The voltage at point $V_1$ falls to less than 0.0V, whereas that at point $V_2$ remains at ground. Transistor $Q_{12}$ is rendered conductive by virtue of the more positive voltage applied to its base, and the voltage at point $V_3$ is at approximately $-0.5V$, which voltage is transmitted over line 136 as a binary 1. When line 128 returns to a logical 1 state, transistor $Q_{14}$ is rendered nonconductive, and transistor $Q_{18}$ is rendered conductive to store a binary 1 in the latch circuit. The binary 1 output over line 136 is the desired multiplication by unity of the binary 1 input to line 121.

Conversely, when input bit $D_i=0$, transistor $Q_3$ becomes conductive, and transistor $Q_4$ becomes nonconductive. With transistor $Q_3$ conductive, a current path is formed from ground across resistor $R_2$ over line 122, across the collector-emitter junctions of transistors $Q_3$ and $Q_{14}$, through resistor $R_4$ to the $-3.3V$ current source. The voltage at point $V_2$ falls to less than ground, and that at point $V_1$ remains at ground. Thus transistors $Q_{10}$ and $Q_{11}$ become conductive, while transistors $Q_9$ and $Q_{12}$ are rendered nonconductive. With transistor $Q_{12}$ nonconductive, the potential at point $V_3$ is at ground, which is transmitted over line 136 representing a binary 0 output. The binary 0 output over line 136 is the desired product of the binary 0 input over line 121 times unity. As before, when signal C4 goes to a logical 1, a binary 0 is stored until the next cycle.

Figure 5:
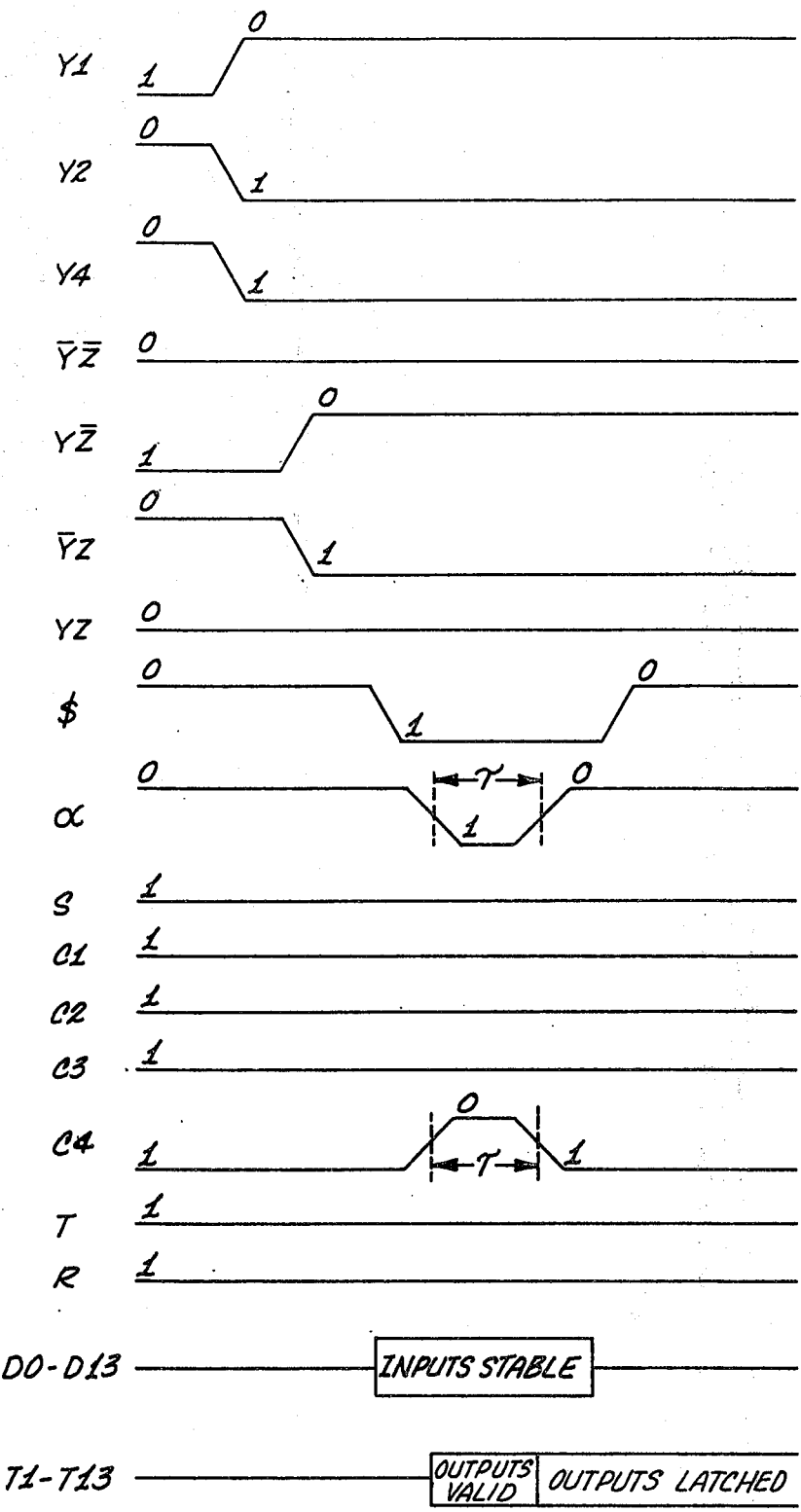
FIG. 5 shows a timing diagram illustrating the operation of the embodiment of FIG. 1 for a different state of the control signals Y4 Y2 Y1.

FIG. 5 shows a timing diagram illustrating the timing relationship between the various control, input, logic, and output signals for the multiplication by unity condition just discussed, and, in particular, where Y4 Y2 Y1 = 110. The outputs $\overline{YZ} = 0$ and $\overline{YZ} = 0$ of logic circuit 10 and outputs $\overline{YZ} = 1$ and $YZ = 0$ of logic circuit 11 are generated a short time after the 3-bit control signal Y4 Y2 Y1 switches from previous state 001 to new state 110.

Clock signal $ goes to logical 1, and a short time later the output $\alpha$ of AND-gate 18 goes to logical 1, where it remains for the time T it takes delay circuit 17 to switch from a logical 1 to a logical 0. While signal $\alpha$ is in the 1 state, NAND-gate 24 generates a logical 0, which is transmitted over line 65 as C4=0. The D0–D13 inputs to selector latch logic circuits 101–113 must be stable during the time T that signal C4 is in the 0 state. During such time T logic circuit 101 accepts inputs D0 and D1. After the expiration of time T, signal C4 returns to the logical 1 state. Current is transferred from transistor $Q_3$ or $Q_4$ and transistor $Q_{14}$ into transistor $Q_9$ or $Q_{10}$ and transistor $Q_{18}$. Transistor $Q_9$ or $Q_{10}$ remains in the $T_i$ state and is latched in that state until the next clock cycle.

By referring to the STATE TABLE, and to the detailed circuit schematic of FIG. 2, as in the preceding example, it will be seen that the selector latch logic circuit 101 generates as an output the ones-complement $\overline{D_{i-1}}$ of the next lowest binary bit $D_{i-1}$ when the control signal Y4 Y2 Y1 takes the form 011. Such function is equivalent to multiplication of the input binary number by $-2$. When the control signal input Y4 Y2 Y1 has the form 100, the output from the selector latch logic circuit 101 is equal to the next lowest order bit of the input binary number, or $D_{i-1}$, and such function is equivalent to multiplication of the input binary number by 2. When the control input Y4 Y2 Y1 takes the form 001 or 010, the output of the selector latch logic circuit 101 is the ones-complement of the input bit from the input binary number, and such function is equivalent to multiplication of the input binary number by $-1$. When the control signal Y4 Y2 Y1 has the form 000 or 111, the output of the selector latch logic circuit 101 is 0, which is equal to multiplication of the input binary number by 0.

Figure 3:
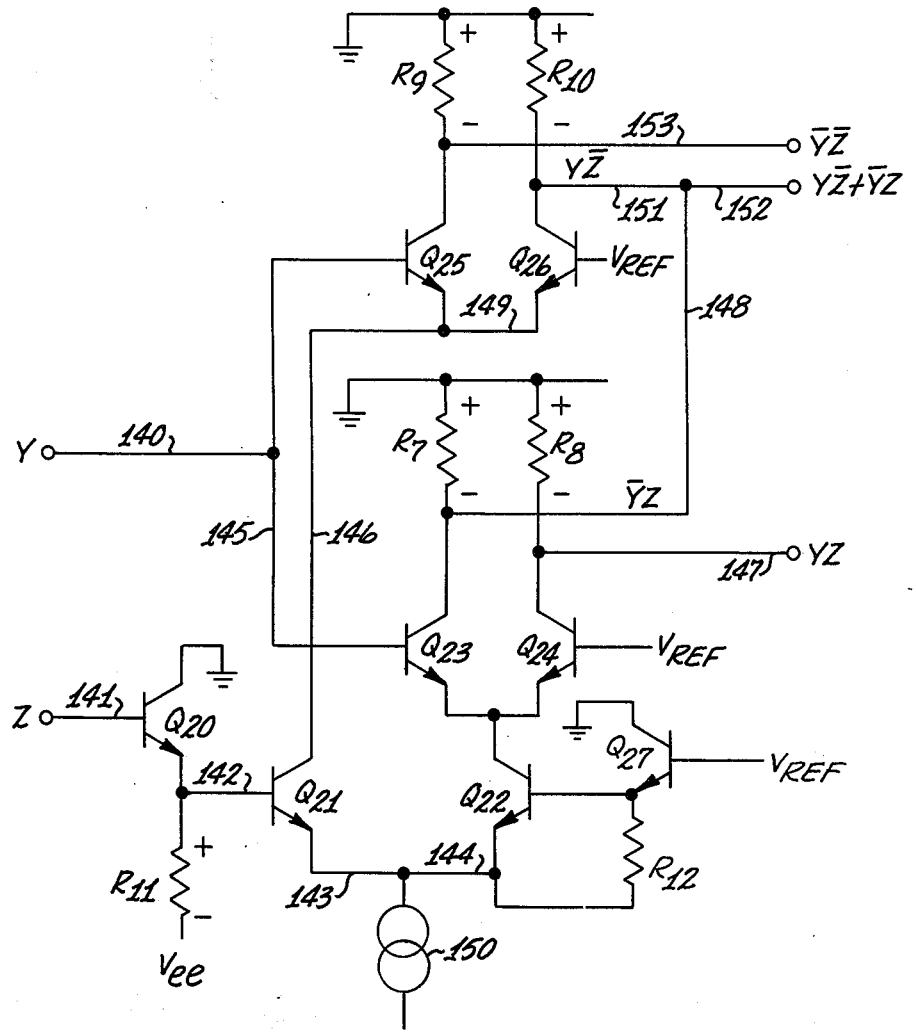
FIG. 3 shows a detailed circuit schematic of a portion of the control circuit shown in FIG. 1.

FIG. 3 represents a detailed circuit schematic of a portion of the control circuit 1 illustrated in FIG. 1. The portion of the control circuit 1 which is illustrated in FIG. 3 comprises logic gates 10, 11, and 13, emitter follower 12, and distributed-OR junction 15. N-P-N transistors $Q_{20}$–$Q_{27}$ are operated in a soft-saturating current mode. The circuit accepts inputs Y and Z over lines 140 and 141, respectively, and generates the logic functions $\overline{YZ}$ over line 153, $Y\overline{Z}+\overline{Y}Z$ over line 152, and Y Z over line 147.

As in the FIG. 2 circuit, a negative logic convention is employed, so that a voltage of 0.0V represents a logical 0, and a voltage of $-0.5V$ represents a logical 1. When both the Y and Z inputs are binary 0's, the voltage transmitted over lines 140 and 141 is 0.0V. Transistor $Q_{20}$ serves to drop the voltage appearing on line 141 by 0.8V, its base-to-emitter potential. When 0.0V is present on line 141, the voltage at the base of transistor $Q_{21}$ is high enough to cause transistor $Q_{21}$ to become conductive. The 0.0V signal over line 140 to the base of transistor $Q_{25}$ makes transistor $Q_{25}$ conductive, thereby forming a conductive path between current source 150 over line segment 143 through the emitter-collector junctions of $Q_{21}$ and $Q_{25}$ and through resistor $R_9$ to ground, causing a $-0.5V$ representing a logical 1 output to be present on line 153, which is the proper output for the condition when Y=1 and Z=1.

When the Y input signal applied to line 140 is a binary 0 and signal Z applied to line 141 is a binary 1, transistor $Q_{21}$ is turned off because of the decreased potential difference across its base-to-emitter junction. Transistor $Q_{22}$ is rendered conductive because of the increased potential across its emitter-to-base junction. Transistor $Q_{23}$ is conductive because of the 0.0V appearing on line segment 145 to its base. Thus a current path is formed from ground across resistor $R_7$, across the collector-emitter junctions of transistors $Q_{23}$ and $Q_{22}$, over line segment 144 to current source 150, resulting in a $-0.5V$ output on line 148 representing a logical 1, which is a proper output for the condition when Y=0 and Z=1.

When the signal inputs over lines 140 and 141 are reversed, i.e., signal Y=1 and Z=0, transistor $Q_{21}$ is conductive, transistor $Q_{25}$ is nonconductive and transistor $Q_{26}$ is conductive, affording a current path from ground through resistor $R_{10}$ across the collector-emitter junctions of transistors $Q_{26}$ and $Q_{21}$ over line segment 151 representing a logical 1, which is the proper output when Y=1 and Z=0.

When both inputs X and Y are binary 1's, transistors $Q_{22}$ and $Q_{24}$ are conductive, providing a current path from ground through resistor $R_8$, across the collector-emitter junctions of transistors $Q_{24}$ and $Q_{22}$, over line segment 44 to current source 150, thereby providing a $-0.5V$ over line 147 representative of the condition Y=1 and Z=1.

It will be apparent to those skilled in the art that the disclosed Multiple-Generating Register may be modified in numerous ways and may assume many embodiments other than the preferred embodiment specifically set out and described above. For example, in order to generate multiples of binary numbers having a greater number of bits than the capacity of the multiple-generating register of the preferred embodiment, two or more multiple-generating registers may be connected together, so that the low order selector latch logic circuit of one multiple-generating register, rather than being responsive to a zero-valued binary bit, is responsive to the highest order bit input into the next lowest multiple-generating register. Also, transistors $Q_{11}$ and $Q_{12}$ of the selector latch logic circuit (FIG. 2) could be deleted from the circuit if desired, since they serve primarily to provide enhanced drive and to provide electrical isolation of the latch transistors $Q_9$ and $Q_{10}$ from noise in packaging portions of the output leads. Furthermore, by setting the base of the output transistor at $V_{Ref}$, the differential feed to the output transistor could be made single-ended from either $V_1$ or $V_2$.

Accordingly, it is intended by the appended claims to cover all modifications of the invention which fall within the true spirit and scope of the invention.

What is claimed is:

1. A multiple-generating register for generating multiples of a first binary number which is input thereto, said register comprising:
   a control circuit responsive to a first control signal for generating a second control signal, said second control signal representing one of a plurality of possible multiple-generating commands; and
   a plurality of logic circuits, one for each bit of said first binary number, each receiving as a first input a respective bit of said first binary number and receiving as a second input the next lowest order bit of said first binary number, except that said logic circuit which receives as a first input the lowest order bit of said first binary number receives as a second input a zero-valued binary bit, said plurality of logic circuits generating a second binary number which is a multiple of said first binary number in response to said second control signal, each of said logic circuits comprising:
   a storage latch having first, second, and third current leads and an output lead;
   a current source;
   a register current switch, said register current switch being connected between said third current lead of said latch and said current source;
   a first pair of upper level current switches each having a signal input lead for receiving said first input to said logic circuit, first and second current input leads, and a current output lead, said first current input lead of a first one of said first pair of upper level current switches being connected to said first current lead of said latch and said first current input lead of the second one of said first pair of upper level current switches being connected to said second current lead of said latch, said second current input lead of said first one of said first pair of upper level current switches being connected to said second current lead of said latch, and said second current input lead of said second one of said first pair of upper level current switches being connected to said first current lead of said latch;
   a second pair of upper level current switches each having a signal input lead for receiving said second input to said logic circuit, first and second current input leads, and a current output lead, said first current input lead of a first one of said second pair of upper level current switches being connected to said first current lead of said latch, said first current input lead of the second one of said second pair of upper level current switches being connected to said second current lead of said latch, said second current input lead of said first one of said second pair of upper level current switches being connected to said second current lead of said latch, and said second current input lead of said second one of said second pair of upper level current switches being connected to said first current lead of said latch; and
   four lower level current switches each having a signal input lead responsive to one of said plurality of multiple-generating commands, each of said lower level current switches being connected between said current output lead of a respective one of said upper level current switches and said current source.

2. A multiple-generating register for generating a multiple of a first binary number which is input thereto, said register comprising:
   a control circuit responsive to a first control signal for generating a second control signal, said second control signal representing a multiple-generating command; and
   a plurality of logic circuits, one for each bit of said first binary number, each receiving as a first input a respective bit of said first binary number and receiving as a second input the next lowest order bit of said first binary number, except that said logic circuit which receives as a first input the lowest order bit of said first binary number receives as a second input a zero-valued binary bit, each of said logic circuits generating, in response to said second control signal, a respective bit of a second binary number, said respective bit of said second binary number being the ones-complement of the corresponding bit of said first binary number, whereby said plurality of logic circuits together generate said second binary number which is equal to said first binary number multiplied by minus one, each of said logic circuits comprising:
   a storage latch having first, second, and third current leads and an output lead;
   a current source;
   a register current switch, said register current switch being connected between said third current lead of said latch and said current source;
   a first pair of upper level current switches each having a signal input lead for receiving said first input to said logic circuit, first and second current input leads, and a current output lead, said first current input lead of a first one of said first pair of upper level current switches being connected to said first current lead of said latch and said first current input lead of the second one of said first pair of upper level current switches being connected to said second current lead of said latch, said second current input lead of said first one of said first pair of upper level current switches being connected to said second current lead of said latch, and said second current input lead of said second one of said first pair of upper level current switches being connected to said first current lead of said latch;

a second pair of upper level current switches each having a signal input lead for receiving said second input to said logic circuit, first and second current input leads, and a current output lead, said first current input lead of a first one of said second pair of upper level current switches being connected to said first current lead of said latch, said first current input lead of the second one of said second pair of upper level current switches being connected to said second current lead of said latch, said second current input lead of said first one of said second pair of upper level current switches being connected to said second current lead of said latch, and said second current input lead of said second one of said second pair of upper level current switches being connected to said first current lead of said latch; and four lower level current switches each having a signal input lead, a first one of said lower level current switches being connected between said current output lead of said second one of said first pair of upper level current switches and said current source and having its signal input lead responsive to said second control signal, and each of the remainder of said lower level current switches being connected between the current output leads of a respective one of the remainder of said upper level current switches and said current source.

3. A multiple-generating register for generating multiples of a first binary number which is input thereto, said register comprising:

a control circuit responsive to a control signal for generating alternatively first and second multiple-generating commands, depending upon the informational content of said control signal; and a plurality of logic circuits, one for each bit in said first binary number, each receiving as a first input a respective bit of said first binary number and receiving as a second input the next lowest order bit of said first binary number, except that said logic circuit which receives as a first input the lowest order bit of said first binary number receives as a second input a zero-valued binary bit, each of said logic circuits generating as an output the complement of the bit received as said first input in response to said first multiple-generating command, and each of said logic circuits generating as an output the value of the bit received as said second input in response to said second multiple-generating command, whereby said plurality of logic circuits together generate a second binary number which is equal to said first binary number multiplied by minus one, in response to said first multiple-generating command, and generate a second binary number which is equal to said first binary number multiplied by two, in response to said second multiple-generating command, each of said logic circuits comprising:

a storage latch having first, second, and third current leads and an output lead;

a current source;

a register current switch, said register current switch being connected between said third current lead of said latch and said current source;

a first pair of upper level current switches each having a signal input lead for receiving said first input to said logic circuit, first and second current input leads, and a current output lead, said first current input lead of a first one of said first pair of upper level current switches being connected to said first current lead of said latch and said first current input lead of the second one of said first pair of upper level current switches being connected to said second current lead of said latch, said second current input lead of said first one of said first pair of upper level current switches being connected to said second current lead of said latch, and said second current input lead of said second one of said first pair of upper level current switches being connected to said first current lead of said latch;

a second pair of upper level current switches each having a signal input lead for receiving said second input to said logic circuit, first and second current input leads, and a current output lead, said first current input lead of a first one of said second pair of upper level current switches being connected to said first current lead of said latch, said first current input lead of the second one of said second pair of upper level current switches being connected to said second current lead of said latch, said second current input lead of said first one of said second pair of upper level current switches being connected to said second current lead of said latch, and said second current input lead of said second one of said second pair of upper level current switches being connected to said first current lead of said latch; and four lower level current switches each having a signal input lead, a first one of said lower level current switches being connected between said current output lead of said second one of said first pair of upper level current switches and said current source and having its signal input lead responsive to said first multiple-generating command, a second one of said lower level current switches being connected between said current output lead of said first one of said second pair of upper level current switches and said current source and having its signal input lead responsive to said second multiple-generating command, and each of the remainder of said lower level current switches being connected between the current output lead of a respective one of the remainder of said upper level current switches and said current source.

4. A multiple-generating register for generating multiples of a first binary number which is input thereto, said register comprising:

a control circuit responsive to a control signal for generating alternatively first, second, third, and fourth multiple-generating commands, depending upon the informational content of said control signal; and a plurality of logic circuits, one for each bit in said first binary number, each receiving as a first input a respective bit of said first binary number and receiving as a second input the next lowest order bit of said first binary number, except that said logic circuit which receives as a first input the lowest order bit of said first binary number receives as a second input a zero-valued binary bit, each of said logic circuits generating as an output the bit received as said first input in response to said fir multiple-generating command, each of said logic circuits generating as an output the ones-complement of the bit received as said first input in response to said second multiple-generating command, each of said logic circuits generating as an output the bit received as said second input in response to said third multiple-generating command, and each of said logic circuits generating as an output the ones-complement of the bit received as said second input in response to said fourth multiple-generating command, whereby said plurality of logic circuits together generate a second binary number which is equal to said first binary number multiplied by one in response to said first multiple-generating command, by minus one in response to said second multiple-generating command, by two in response to said third multiple-generating command, and by minus two in response to said fourth multiple-generating command, each of said logic circuits comprising:

a storage latch having first, second, and third current leads and an output lead;

a current source;

a register current switch, said register current switch being connected between said third current lead of said latch and said current source;

a first pair of upper level current switches each having a signal input lead for receiving said first input to said logic circuit, first and second current input leads, and a current output lead, said first current input lead of a first one of said first pair of upper level current switches being connected to said first current lead of said latch and said first current input lead of the second one of said first pair of upper level current switches being connected to said second current lead of said latch, said second current input lead of said first one of said first pair of upper level current switches being connected to said second current lead of said latch, and said second current input lead of said second one of said first pair of upper level current switches being connected to said first current lead of said latch;

a second pair of upper level current switches each having a signal input lead for receiving said second input to said logic circuit, first and second current input leads, and a current output lead, said first current input lead of a first one of said second pair of upper level current switches being connected to said first current lead of said latch, said first current input lead of the second one of said second pair of upper level current switches being connected to said second current lead of said latch, said second current input lead of said first one of said second pair of upper level current switches being connected to said second current lead of said latch, and said second current input lead of said second one of said second pair of upper level current switches being connected to said first current lead of said latch; and four lower level current switches each having a signal input lead responsive to one of said multiple-generating commands, each of said lower level current switches being connected between said current output lead of a respective one of said upper level current switches and said current source.

* * * * *